(12) United States Patent
Bilde

(10) Patent No.: US 9,426,943 B2
(45) Date of Patent: Aug. 30, 2016

(54) COMBINE HARVESTER GRAIN CLEANING APPARATUS

(75) Inventor: Morten Leth Bilde, Langaa (DK)

(73) Assignee: AGCO A/S, Randers (DK)

( * ) Notice: Subject to any disclaimer, the term of this patent is extended or adjusted under 35 U.S.C. 154(b) by 317 days.

(21) Appl. No.: 13/980,125

(22) PCT Filed: Dec. 15, 2011

(86) PCT No.: PCT/EP2011/073002
§ 371 (c)(1),
(2), (4) Date: Nov. 15, 2013

(87) PCT Pub. No.: WO2012/097933
PCT Pub. Date: Jul. 26, 2012

(65) Prior Publication Data
US 2014/0066145 A1   Mar. 6, 2014

(30) Foreign Application Priority Data
Jan. 17, 2011 (GB) .................................. 1100675.6

(51) Int. Cl.
*A01F 12/30* (2006.01)
*A01F 12/44* (2006.01)

(52) U.S. Cl.
CPC .......... *A01F 12/444* (2013.01); *A01F 12/446* (2013.01)

(58) Field of Classification Search
CPC .................................................. A01F 12/446
USPC ........................ 460/90–93, 96, 97, 99–102
See application file for complete search history.

(56) References Cited

U.S. PATENT DOCUMENTS 3,347,375 A    10/1967  Hofer
3,935,866 A *  2/1976  Northup et al. .................. 460/4
(Continued)

FOREIGN PATENT DOCUMENTS

BR    7705169 A     4/1978
CA    1050849 A1    3/1979
(Continued)

OTHER PUBLICATIONS

International Search Report for International Application No. PCT/EP2011/073002 Dated Mar. 13, 2012.
(Continued)

*Primary Examiner* — Thomas B Will
*Assistant Examiner* — Mai Nguyen

(57) ABSTRACT

A combine harvester comprises an oscillating thresher pan (128;228;328) for conveying a chaff/grain stream rearwardly to a rear edge from where the grain/chaff stream falls under gravity into a cleaning unit (148;248;348). The cleaning unit, or shoe, includes at least one vibrating pan (150; 250;350,151;251;351) onto which the grain/chaff stream falls. The cleaning unit comprising a fan (52) for generating a cleaning airstream which is directed through the failing grain/chaff stream. The cleaning pan, when in use, is provided with a damping surface to damp bounce of kernels falling thereupon. In one example, the damping surface is provided by a sheet of rubber (284,288).

6 Claims, 5 Drawing Sheets

(56) References Cited

U.S. PATENT DOCUMENTS

| | | | |
|---|---|---|---|
| 4,007,744 A * | 2/1977 | Shaver | 460/74 |
| 4,103,691 A * | 8/1978 | Shaver | 460/91 |
| 4,149,360 A * | 4/1979 | Rowland-Hill | 56/14.6 |
| 4,355,647 A * | 10/1982 | Heidjann et al. | 460/91 |
| 4,627,446 A | 12/1986 | Huhman | |
| 4,693,259 A * | 9/1987 | Freye et al. | 460/100 |
| 5,466,190 A * | 11/1995 | Skinner et al. | 460/101 |
| 5,653,633 A * | 8/1997 | Kalverkamp et al. | 460/114 |
| 6,932,697 B2 * | 8/2005 | Baumgarten et al. | 460/1 |
| 2003/0140612 A1 * | 7/2003 | Gorden | 56/100 |
| 2006/0270473 A1 * | 11/2006 | Straeter | 460/99 |
| 2006/0281506 A1 * | 12/2006 | Weichholdt | 460/101 |
| 2013/0157732 A1 * | 6/2013 | Kopriva et al. | 460/100 |

FOREIGN PATENT DOCUMENTS

| | | |
|---|---|---|
| EP | 0898875 A1 | 3/1999 |
| GB | 1314382 A | 4/1973 |
| GB | 2063034 A | 6/1981 |
| GB | 2224423 A | 5/1990 |
| RU | 2348143 | 6/2007 |

OTHER PUBLICATIONS

UK Search Report for UK Application No. 1100675.6 Dated May 12, 2011.

* cited by examiner

COMBINE HARVESTER GRAIN CLEANING APPARATUS

CROSS-REFERENCE TO RELATED APPLICATION

The present application claims the benefit of and priority from United Kingdom Application No. 1100675.6, filed Jan. 17, 2011, the entire disclosure of which is hereby incorporated by reference.

FIELD OF THE INVENTION

The invention relates to the processing of a crop stream in a combine harvester and more particularly to the cleaning unit for cleaning the crop stream.

BACKGROUND

For many decades, self-propelled combine harvesters have been used by farmers to harvest a wide range of crops including cereals, maize and oil-seed rape. Typically, a combine harvester cuts the crop material, threshes the grain therefrom, separates the grain from the straw, and cleans the grain before storing in an onboard tank. Straw and crop residue is ejected from the rear of the machine.

Combines of the transverse threshing type comprise a threshing cylinder which rotates on a transverse axis and serves to thresh a harvested crop stream. Grain and chaff separated in this process falls under gravity through a grate onto an underlying thresher pan which is driven in an oscillating manner to convey the grain and chaff rearwardly to a rear edge from where the grain and chaff falls under gravity into a cleaning unit. The remainder of the crop stream from the threshing process is conveyed rearwardly from the threshing cylinder into separating apparatus which may include a plurality of straw walkers or one or more axial rotors. During the separating process further grain and chaff is removed from the straw and falls under gravity through a grate onto an underlying separator pan which is also driven in an oscillating manner to convey the grain and chaff forwardly to a front edge from where it falls under gravity into the cleaning unit. The straw by-product from the separating apparatus is ejected from the rear of the combine.

The cleaning unit of most combines operates according to a well-established process in which grain and chaff cascading down from the thresher and separator pans is subjected to an airstream created by a fan. The airstream blows the lighter chaff and dust rearwardly and out of the combine whilst the heavier grain falls onto and through a series of cleaning sieves before being conveyed to the grain tank.

The speed of the airflow is chosen so as to maximise the percentage of chaff removed from the crop-stream whilst minimising the percentage grain loss from the rear of the machine.

Developments in threshing and separating technology of recent years have not been matched by an increase in capacity of the cleaning unit. The bottleneck presented by the cleaning unit therefore inhibits utilisation of the full potential of modern separating technology.

SUMMARY OF INVENTION

It is, therefore, an object of the invention to improve the cleaning process in combine harvesters to alleviate this bottleneck.

In accordance with the invention there is provided a combine harvester comprising an oscillating thresher pan for conveying a grain/chaff stream rearwardly to a rear edge from where the grain/chaff stream falls under gravity into a cleaning unit which includes at least one vibrating cleaning pan onto which the grain/chaff stream falls, the cleaning unit comprising a fan for generating a cleaning airstream which is directed through the falling grain/chaff stream, wherein the cleaning pan when in use is provided with a damping surface to damp bounce of kernels falling thereupon.

The invention involves the recognition that the grain, or kernels, in the crop stream exhibits a bounce as it falls onto the various surfaces of the cleaning unit. As the grain bounces on the hard surfaces of known cleaning unit components, they are subjected again to the airstream and carried rearwardly. A significant proportion of the grain lost from the rear of the cleaning shoe has been found to be due to this bouncing of the grain.

As mentioned above, the grain loss is minimised by reducing the speed of the cleaning airstream generated by the fan. However, reducing the speed of the airstream reduces the effectiveness of removing the chaff.

By providing a damping surface onto which the cascading grain/chaff stream falls, the bouncing effect is reduced. Advantageously, this allows the operator to run the cleaning shoe with an increased fan speed (as compared to conventional combines) thus improving the efficiency and capacity of the cleaning shoe and the overall combine.

In a first embodiment, the cleaning pan is provided with a plurality of upstanding transverse ridges which trap a layer of grain on the top surface of the cleaning pan. The trapped layer of grain thereby serves as said damping surface. Alternatively, the transverse ridges can be replaced with discrete pockets or detents formed in the top surface of the pan.

In a second embodiment, the damping surface is formed of rubber.

A sheet of rubber-based material may be fixed to the cleaning pan to provide the damping surface. The sheet of rubber-based material is preferably fixed to the cleaning pan along a forward edge of the sheet only leaving the rear and at least part of the side edges thereof free to move relative to the cleaning pan. By leaving the rear edge of the rubber sheet unattached, the motion of the pan will to some extent hold the rubber sheet in a floating state which increases the shock absorbing effect further.

Preferably, the sheet of rubber-based material is provided with a plurality of transverse ribs which improve the conveyance effect for the grain.

In a third embodiment, the damping surface comprises a rubber coating. The rubber coating can be applied to existing components of the cleaning shoe using known techniques, using liquid latex for example. Alternatively, the components can be fabricated using a composite material with a soft rubber surface and a solid metal core.

One advantage of employing a rubber coating (over the rubber sheets) is that grids and louvers can be provided with a damping surface in addition to the various cleaning pans. Therefore, kernel bounce is reduced further within the cleaning shoe.

Typically, the cascading process of the crop stream within the cleaning unit, or shoe, consists of two or more steps involving a plurality of vibrating, or oscillating, pans. In one arrangement a first cleaning pan comprises a vibrating cascade pan and a second cleaning pan comprises a vibrating chaffer pan, wherein the grain/chaff stream falls from said rear edge of the thresher pan onto the cascade pan before falling from a rear edge of the cascade pan onto the chaffer pan, and wherein parallel cleaning airstreams are directed through the falling grain/chaff stream between the respective pans.

Preferably both the cascade pan and chaffer pan are provided with damping surfaces. In addition, the chaffer pan may comprise a plurality of rubber-coated louvers. At least one of the thresher pan and cascade pan may comprise a rubber-coated comb or grid attached to the rear edge thereof to divert long straw and weeds away from the cascading grain flow.

BRIEF DESCRIPTION OF THE DRAWINGS

Further advantages of the invention will become apparent from reading the following description of specific embodiments with reference to the appended drawings in which.

DESCRIPTION OF EXAMPLE EMBODIMENTS

From reading the following description it should be understood that the terms longitudinal and transverse are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft wherein axial relates to a direction along the rotation axis and radial equates to a direction perpendicular to the rotation axis.

Figure 1:
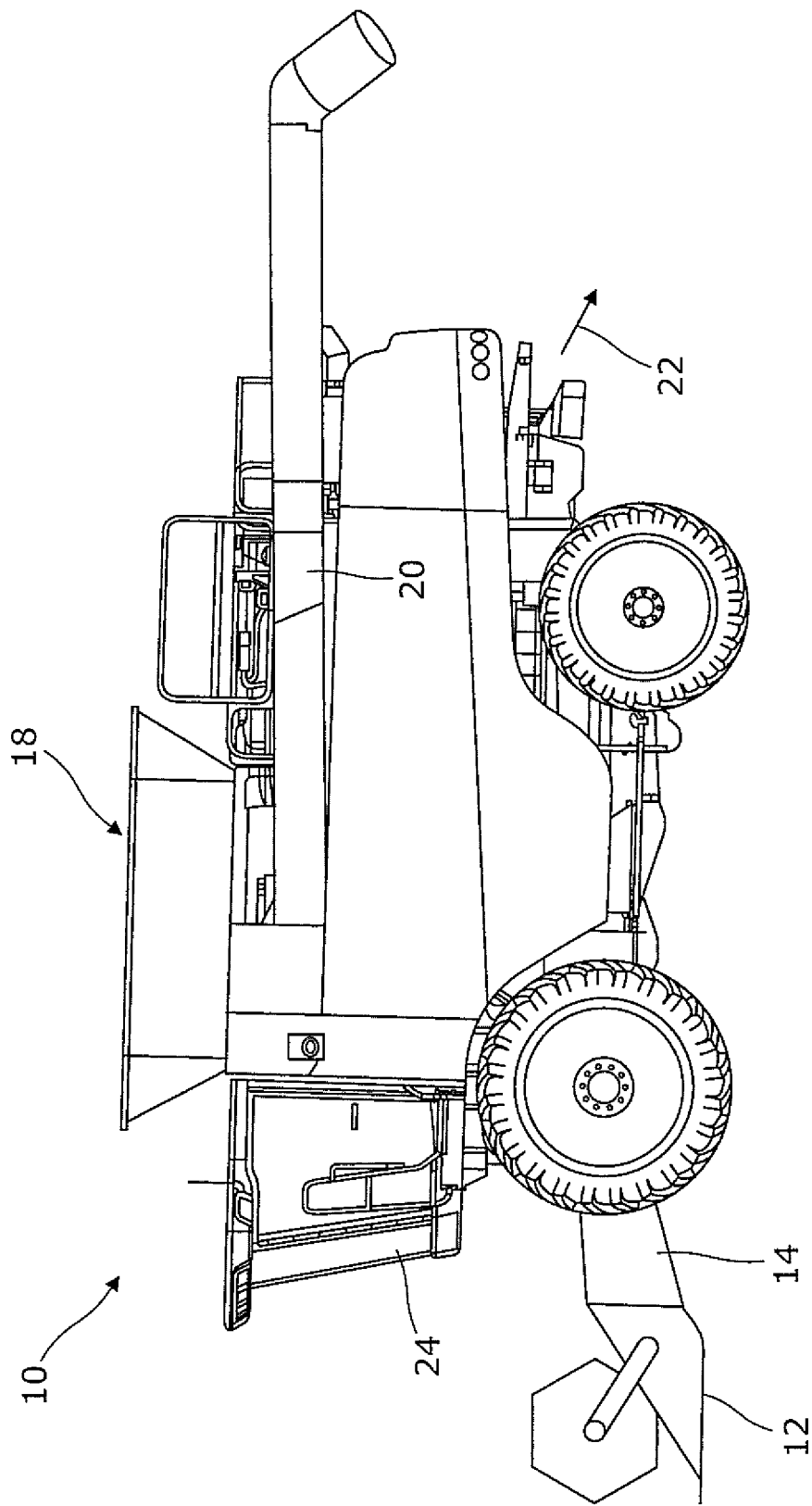
FIG. 1 is a side elevation of a combine harvester.

With reference to FIG. 1, a self-propelled combine harvester 10 comprises a header 12 which cuts and gathers a strip of crop as the combine harvester is driven across a crop field. An elevator section 14 conveys the crop stream from the header 12 into a central processing apparatus 16 described in more detail below. Clean grain separated from the crop stream is collected in a storage tank 18 which is periodically emptied into a trailer (not shown) via an unloading auger 20. Residue material remaining from the crop stream such as straw and chaff is ejected from the rear of the machine represented by arrow 22. For completeness the combine 10 includes a driver's cab 24.

Figure 2:
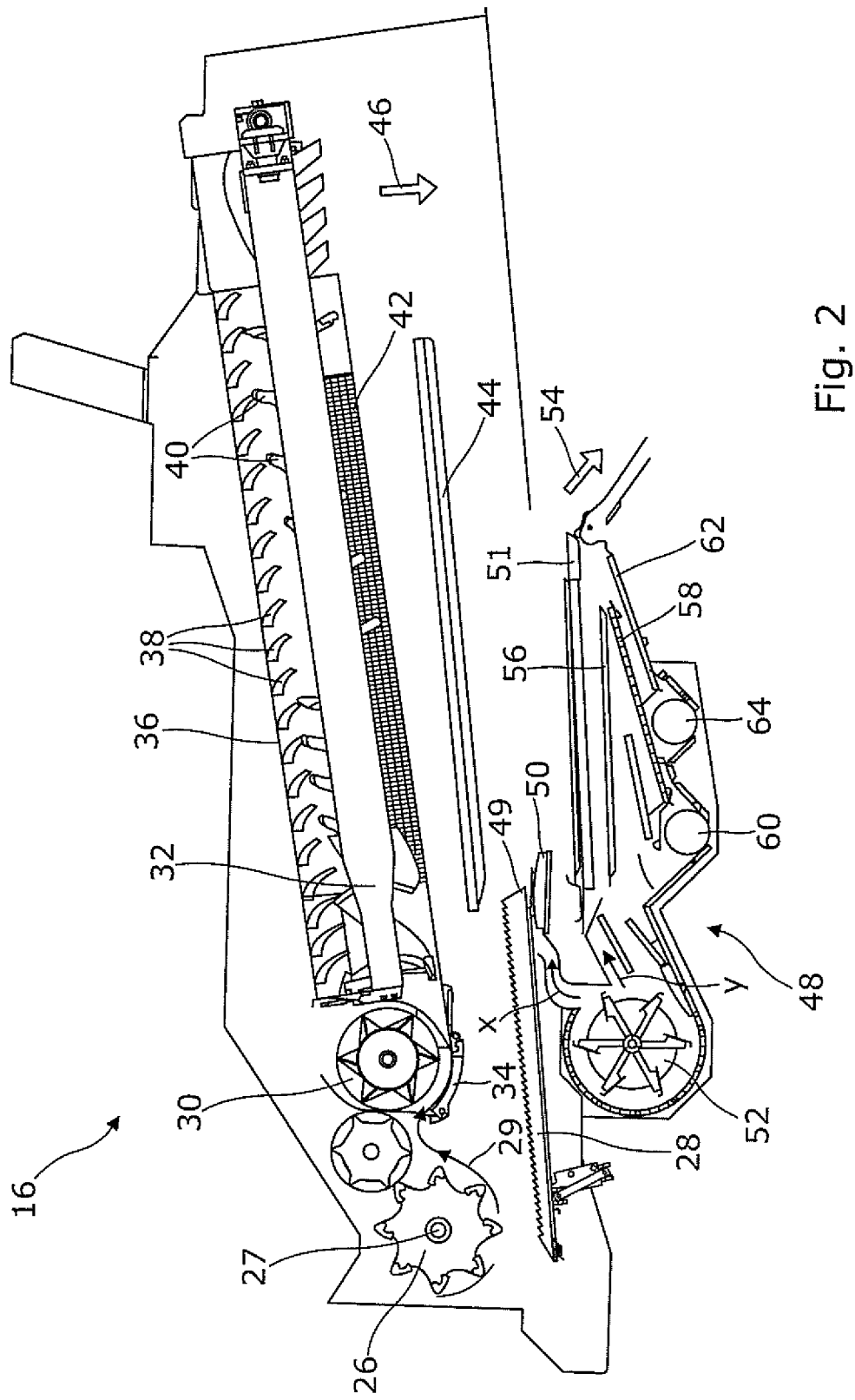
FIG. 2 is a sectional view through the crop processing apparatus of the combine harvester of FIG. 1.

Turning to the details of the crop processing apparatus 16, as shown in FIG. 2, the crop stream passes from the elevator 14 into a threshing unit 26 in the form of a transverse threshing cylinder which rotates in a counter clockwise direction as seen in FIG. 2 around a transverse axis 27. As in known combines the crop stream is threshed between the threshing cylinder 26 and a concaved surface (not shown). Grain and chaff separated in this process falls through a grate in the concave onto an underlying thresher pan 28 forming a primary grain/chaff stream. The residue straw is conveyed rearwardly as represented by arrow 29 from the threshing unit to a transverse transfer beater 30 which also rotates counter clockwise as viewed in FIG. 2. From here the crop stream is divided into two sub-streams and passed into respective longitudinally-aligned separating rotors. It will be appreciated that only one rotor 32 is shown in FIG. 2. The transfer beater 30 has associated therewith a concave grate 34 through which further grain and chaff may fall under gravity onto the underlying thresher pan 28.

The separator apparatus in this case comprises a pair of longitudinal rotors 32, which rotate around a substantially longitudinal axis as in known axial and hybrid combines. Each separating rotor 32 has associated therewith a substantially cylindrical cage 36 within which the rotor rotates. Upon the inside upper peripheral surface of the rotor cages 36 a plurality of guide vanes 38 are mounted for cooperation with fingers 40 mounted to the rotating rotor 32 which together separate the remaining grain from the stream of straw. The lower portion of each cage 36 has a grate 42 formed therein which allows separated grain and chaff to fall under gravity onto an underlying separator pan 44 forming a secondary grain/chaff stream.

The residue straw is ejected from the process apparatus 16 at the rear of the rotors 32 as indicated by arrow 46.

Although the above described separating apparatus comprises a pair of longitudinal rotors operating on the axial separation principle, it is envisaged that these may be replaced with straw walkers known in conventional combines without deviating from the scope of the invention.

Both the thresher pan 28 and separator pan 44 are driven in an oscillating manner known in the art so as to convey the respective grain/chaff streams rearwardly and forwardly respectively. The drive mechanism for the thresher pan 28 and separator pan 44 is conventional and will be described in detail.

After falling onto the thresher pan 28 the primary grain/chaff stream is conveyed rearwardly by the oscillating motion. During conveyance the grain and chaff is stratified meaning that the heavy grain sinks to the bottom of the material layer and the lighter chaff rises to the top. This stratification of the material is of great importance and has a significant positive influence on the following cleaning process executed by the cleaning unit 48. To explain this further the stratified grain and chaff stream falls under gravity from the rear edge 49 of the thresher pan 28 into the cleaning unit 48.

The secondary grain/chaff stream falls from the front edge of the separator pan 44 and combines with the primary grain/chaff stream both of which are conveyed into the cleaning unit 46.

Figure 3:
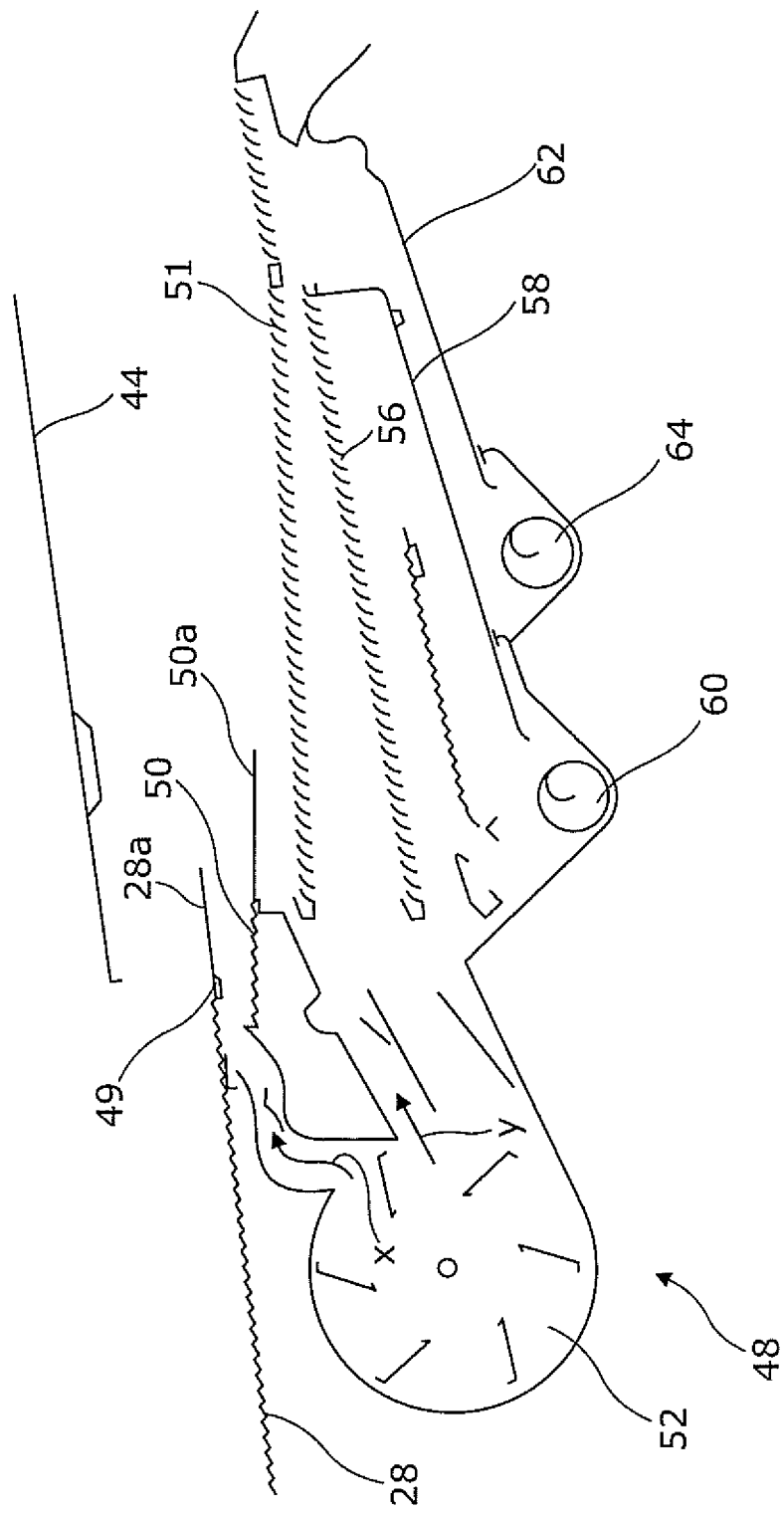
FIG. 3 is an enlarged sectional view of the cleaning unit from the crop processing apparatus of FIG. 2.

The cleaning shoe 48 is shown in more detail in FIG. 3. The grain and chaff initially falls onto a cascade pan 50 before falling from the rear edge thereof onto a first sieve 51. Both the thresher pan 28 and cascade pan 50 are provided with a respective grid 28a, 50a of known construction attached to their respective rear edges. Each grid 28a, 50a serves to convey long straw and weeds rearwardly and away from the cascading grain flow.

A fan 52 generates a cleaning airstream, a portion of which is directed rearwardly between the thresher pan 28 and cascade pan 50 as represented by arrow X. The aforementioned stratification allows the lighter chaff to be blown rearwardly and carried by the airstream out of the rear of the machine as represented by arrow 54 in an uninterrupted manner whilst the heavier grain falls onto the cascade pan 50.

The crop stream falls from the rear edge of the cascade pan 50 onto the first sieve 51 as described above. A further airstream represented by arrow Y is directed rearwardly between the cascade pan and first sieve 51 and also between the successive sieves. Again, the cascading motion of the grain and chaff allows the airstream Y to convey further chaff to the rear of the cleaning unit. First sieve 51 is coarser (with larger holes) than second sieve 56 which is located under first sieve 51.

First sieve 51 and second sieve 56 are driven in an oscillating manner. Straw and material which is too large to pass through first sieve 51 is conveyed rearwardly by the oscillating motion before falling from the rear edge and out of the rear of the combine as indicated by arrow 54.

Tailings, or unthreshed grain, and grain passes through first sieve 51 onto second sieve 56. Grain falls through second sieve 56 onto an underlying collection pan 58 which directs the clean grain to a transverse delivery auger 60 for delivering the grain to the storage tank 18.

The tailings which cannot pass through the holes in second sieve 56 are conveyed rearwardly by the oscillating motion before falling from the rear edge of the sieve 56 onto a tailings collection pan 62 which delivers the tailings to a rethreshing delivery auger 64.

Figure 4:
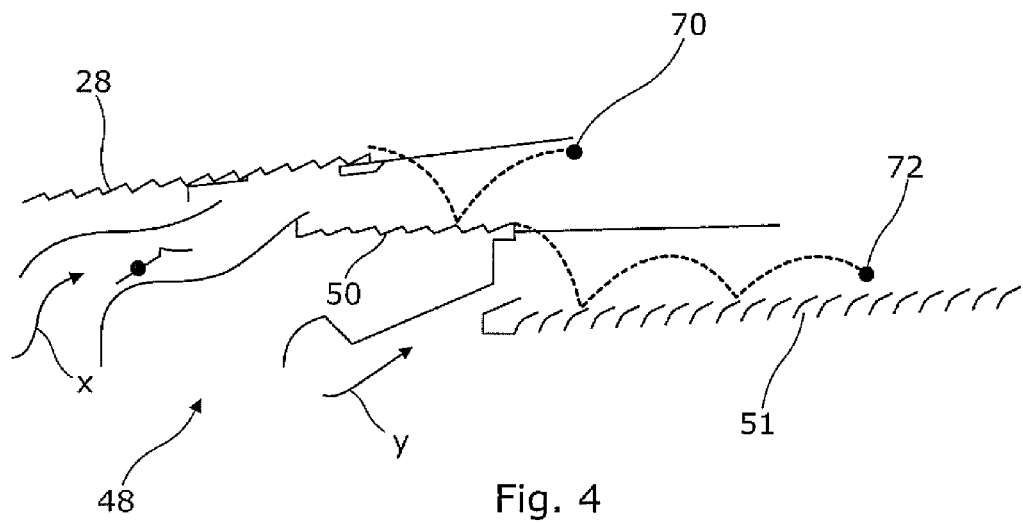
FIG. 4 is an enlarged sectional view of a cleaning unit showing the bouncing grain effect.

Turning back to the cascade process of the grain/chaff stream into the cleaning shoe, investigations of known combines have found that a portion of the heavier grain, or kernels, bounces on impact with the hard surfaces of the cascade pan 50 and louvers of the first sieve, or chaffer 51. This is illustrated in FIG. 4. A grain 70 is shown as bouncing on impact with the cascade pan 50 whilst another grain 72 is shown bouncing along the louvers of chaffer 51. When not in contact with the surfaces of the respective pans 50, 51, the grain is subjected to the airstreams X, Y which increases the proportion of grain loss from the rear of the unit 48.

In accordance with the invention, a damping surface is provided to reduce this kernel bouncing effect.

Figure 5:
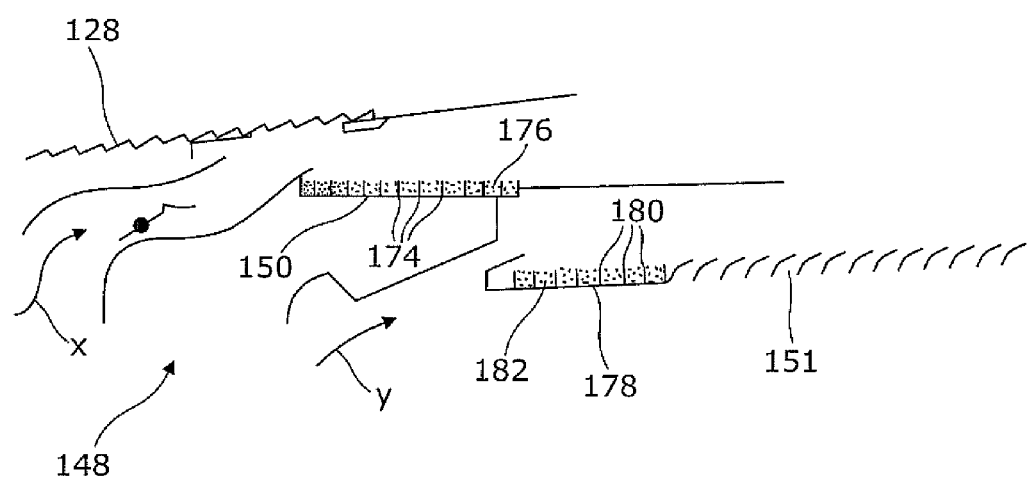
FIG. 5 is an enlarged sectional view of a cleaning unit in accordance with a first embodiment of the invention.

In a first embodiment, shown in FIG. 5, a cleaning unit 148 comprises an oscillating thresher pan 128 of the same construction to that described above in relation to FIGS. 2, 3 and 4. The cascade pan 150, however, is provided with a plurality of upstanding transverse ridges 174 formed in the top surface. The ridges 174 may be formed by fastening a plurality of metal strips to the top of the pan 150. Alternatively, the ridges 174 may be integrated into the structure of the pan 150.

The ridges 174 serve to trap a layer of grain 176 on the top surface of the cascade pan 150 wherein the trapped layer of grain serves as a damping surface for the grain falling from the thresher pan 128. Therefore, a smaller proportion of grain within the grain/chaff stream bounces resulting in less rearward conveyance by the airstream X.

The first sieve, or chaffer 151, is also provided with a front region 178 which comprises a plurality of upstanding transverse ridges 180. Again, the chaffer ridges 180 serve to trap a layer of grain 182 which serves to damp any bounce of the grain falling from the rear edge of the cascade pan. Therefore, a smaller proportion of grain within the grain/chaff stream bounces resulting in less rearward conveyance by the airstream Y.

The grain from the crop stream continues rearwardly, conveyed by the vibrating motion of the chaffer 151, and is cleaned by the sieves in the normal way.

Although preferable to provide upstanding ridges on both the cascade pan 150 and chaffer 151 it should be understood that the ridges may be provided on only one of these components without deviating from the scope of the invention.

Figure 6:
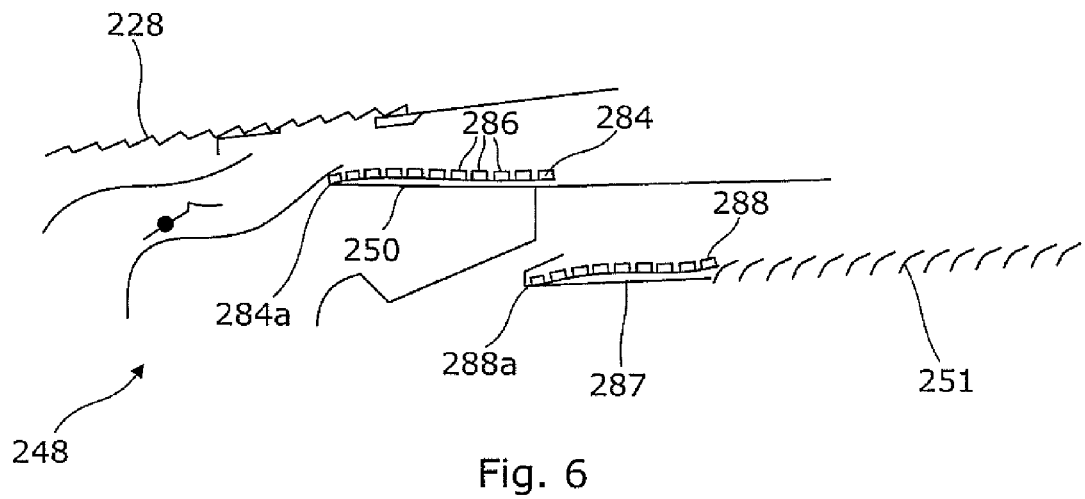
FIG. 6 is an enlarged sectional view of a cleaning unit in accordance with a second embodiment of the invention; and, FIG. 7 is an enlarged sectional view of a cleaning unit in accordance with a third embodiment of the invention.

In a second embodiment, shown in FIG. 6, a cleaning unit 248 comprises an oscillating thresher pan 228 of the same construction to that described above in relation to FIGS. 2, 3 and 4. In this case, the cascade pan 250 is provided with a damping surface in the form of a rubber sheet 284 which reduces grain bounce in a similar manner to the trapped grain layer as described above. The rubber sheet 284 extends across the width of the cascade pan 250 and is attached along its front edge 284a only so that the vibrating motion of the pan 250 causes the sheet 284 to 'float' above the pan 250. This floating motion of the rubber sheet 284 presents an even greater damping effect, thereby further reducing any grain bounce. It will, of course, be appreciated that the rubber sheet 284 could instead be fastened to the cascade pan 250 along its side and/or front edges also.

The rubber sheet 284 is provided with a plurality of transverse ribs 286 which improve the rearward conveyance of the grain stream without exposing it to the airstream from the fan.

The front of chaffer pan 251 is provided with a non-louvered portion 287 which is also covered with a rubber sheet 288 attached only along its front edge 288a.

Although preferable to provide rubber sheets on both the cascade pan 250 and chaffer 251 it should be understood that the sheets may be provided on only one of these components without deviating from the scope of the invention.

The rubber sheets 284, 288 serve to reduce grain bounce as described above. Advantageously, the rubber sheets 284, especially that attached to cascade pan 250, can be retroactively fitted to existing combines without significant modification, thereby delivering immediately improved cleaning shoe performance at low cost.

Figure 7:
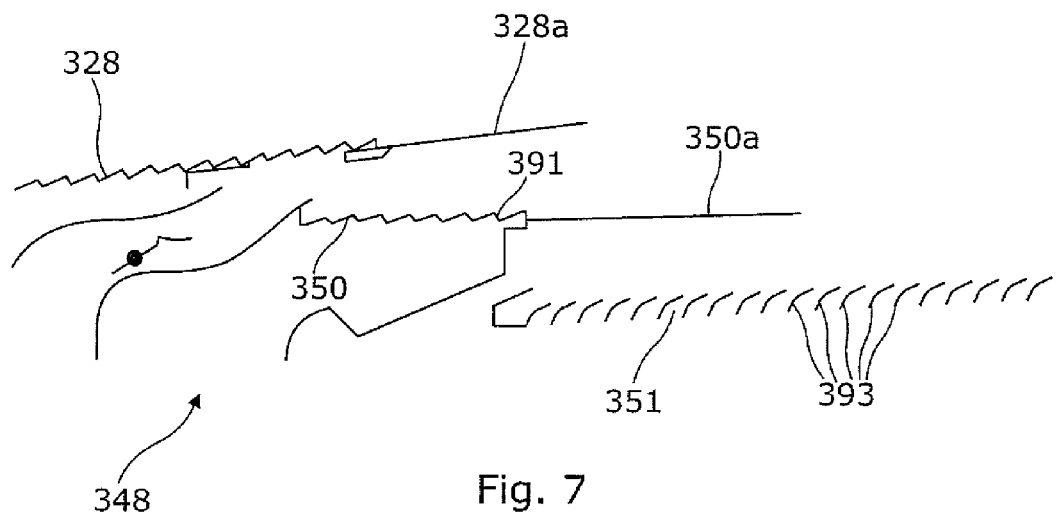

In a third embodiment, shown in FIG. 7, a cleaning unit 348 comprises an oscillating thresher pan 328 of the same construction to that described above in relation to FIGS. 2, 3 and 4. As in the other examples, the thresher pan 328 has a comb of rods 328a, or grid, attached along the rear edge thereof. In this case, however, each rod in the grid 328a is coated with a layer of rubber to provide a shock-absorbing surface.

Likewise, the top surface of the cascade pan 350 is coated with a layer of rubber 391. Also, the grid 350a attached to the rear edge of the cascade pan 350 is coated in a layer of rubber.

Similarly, the louvers 393 of the chaffer pan 351 are coated with a layer of rubber.

By coating the components of the cleaning shoe 348 with a layer of rubber, any bouncing of the grain in the grain/chaff stream is reduced or eliminated. This allows a greater fan speed to be employed thus improving the capacity of the overall combine.

The respective components may be coated with rubber by dipping in liquid latex for example. Alternatively, the components may be fabricated from a composite material with a soft rubber surface and a solid metal core.

Sieves, pans and other components of cleaning units on existing combines can be retroactively coated with rubber at low cost thus achieving immediate benefit.

It will be appreciated that any number of the components that make up the cleaning shoe 348 shown in FIG. 7 may be provided with a rubber coating. In one example alternative, only the cascade pan 350 is provided with a layer of rubber. In another example alternative, only the louvers 393 of the chaffer 351 are coated in rubber.

Moreover, the skilled addressee will appreciate that damping surfaces may be provided for a plurality of cleaning pans exploiting two or more of the examples given above. For example, the cascade pan may be provided with transverse upstanding ridges (to trap a layer of grain) whilst the louvers of the chaffer pan may be coated with a layer of rubber.

The invention claimed is:

1. A combine harvester comprising an oscillating thresher pan for conveying a chaff/grain stream rearwardly to a rear edge from where the grain/chaff stream falls under gravity into a cleaning unit which includes at least one vibrating cleaning pan onto which the grain/chaff stream falls, the cleaning unit comprising a fan for generating a cleaning airstream which is directed through the falling grain/chaff stream, wherein the cleaning pan has fixed thereto a sheet of rubber-based material, wherein the sheet of rubber-based material is fixed to the cleaning pan along a forward edge of the sheet only leaving the rear and at least part of the side edges thereof free to move relative to the cleaning pan.

2. A combine harvester comprising an oscillating thresher pan for conveying a chaff/grain stream rearwardly to a rear edge from where the grain/chaff stream falls under gravity into a cleaning unit which includes at least one vibrating cleaning pan onto which the grain/chaff stream falls, the cleaning unit comprising a fan for generating a cleaning airstream which is directed through the falling grain/chaff stream, wherein the cleaning pan has fixed thereto a damping surface comprising a sheet of rubber-based material to damp bounce of kernels falling thereupon, wherein the sheet of rubber-based material is provided with a plurality of transverse ribs.

3. A combine harvester according to claim 2, wherein the sheet of rubber-based material comprises a rubber coating on the damping surface.

4. A combine harvester comprising an oscillating thresher pan for conveying a chaff/grain stream rearwardly to a rear edge from where the grain/chaff stream falls under gravity into a cleaning unit which includes a first cleaning pan onto which the grain/chaff stream falls and a second cleaning pan, the cleaning unit comprising a fan for generating a cleaning airstream which is directed through the falling grain/chaff stream, wherein at least one of the first cleaning pan and the second cleaning pan has fixed thereto a damping surface to damp bounce of kernels falling thereupon, wherein the first cleaning pan comprises a vibrating cascade pan and the second cleaning pan comprises a vibrating chaffer pan, wherein the grain/chaff stream falls from said rear edge of the thresher pan onto the cascade pan before falling from a rear edge of the cascade pan onto the chaffer pan, and wherein parallel cleaning airstreams are directed through the falling grain/chaff stream between the respective pans, wherein at least one of the thresher pan and cascade pan comprises a rubber-coated comb of rods or grid attached to the rear edge thereof to divert long straw and weeds away from the cascading grain flow.

5. A combine harvester according to claim 4, wherein both the cascade pan and chaffer pan are provided with damping surfaces.

6. A combine harvester according to claim 4, wherein the chaffer pan comprises a plurality of rubber-coated louvers.

* * * * *